United States Patent
Sinha et al.

(10) Patent No.: US 9,135,562 B2
(45) Date of Patent: Sep. 15, 2015

(54) METHOD FOR GENDER VERIFICATION OF INDIVIDUALS BASED ON MULTIMODAL DATA ANALYSIS UTILIZING AN INDIVIDUAL'S EXPRESSION PROMPTED BY A GREETING

(75) Inventors: Aniruddha Sinha, Kolkata (IN); Prateep Misra, Kolkata (IN); Snehasis Banerjee, Kolkata (IN); Arpan Pal, Kolkata (IN)

(73) Assignee: TATA CONSULTANCY SERVICES LIMITED, Mumbai (IN)

(*) Notice: Subject to any disclaimer, the term of this patent is extended or adjusted under 35 U.S.C. 154(b) by 64 days.

(21) Appl. No.: 14/007,421

(22) PCT Filed: Apr. 12, 2012

(86) PCT No.: PCT/IN2012/000265
§ 371 (c)(1),
(2), (4) Date: Sep. 25, 2013

(87) PCT Pub. No.: WO2012/143939
PCT Pub. Date: Oct. 26, 2012

(65) Prior Publication Data
US 2014/0025624 A1    Jan. 23, 2014

(30) Foreign Application Priority Data
Apr. 13, 2011 (IN) .................. 1220/MUM/2011

(51) Int. Cl.
*G06N 5/04* (2006.01)
*G06N 7/00* (2006.01)
*G06Q 10/10* (2012.01)

(52) U.S. Cl.
CPC ............. *G06N 5/048* (2013.01); *G06N 7/005* (2013.01); *G06Q 10/10* (2013.01)

(58) Field of Classification Search
CPC ............................ G06N 5/048; G06N 7/005
USPC ............................................................ 706/52
See application file for complete search history.

(56) References Cited

U.S. PATENT DOCUMENTS

| | | | |
|---|---|---|---|
| 6,964,023 | B2 | 11/2005 | Maes et al. |
| 7,152,033 | B2 | 12/2006 | Gupta et al. |
| 7,620,549 | B2 | 11/2009 | Di Cristo et al. |
| 2001/0001877 | A1 | 5/2001 | French et al. |
| 2002/0169604 | A1 | 11/2002 | Damiba et al. |
| 2003/0110038 | A1 | 6/2003 | Sharma et al. |

(Continued)

OTHER PUBLICATIONS

Castrillon et al., Identity and Gender Recognition Using the Encara Real-Time Face Detector, Conferencia de la Asociacin Espaola para la Inteligencia Artificial 3, 2003.*

(Continued)

*Primary Examiner* — Jeffrey A Gaffin
*Assistant Examiner* — Robert H Bejcek, II
(74) *Attorney, Agent, or Firm* — Finnegan, Henderson, Farabow, Garrett & Dunner L.L.P.

(57) ABSTRACT

The system and method of the present invention are described for automatic detection of error in the entry of particular category of individuals, especially referring to gender and age classification either real time while creating a database of such information or on an existing database on the record of individuals by analyzing their biometric characteristics like speech, image or face and other related demographic information like name of the individual in order to accord each individual with a unique identification.

9 Claims, 2 Drawing Sheets

(56) References Cited

U.S. PATENT DOCUMENTS

Figure 1:
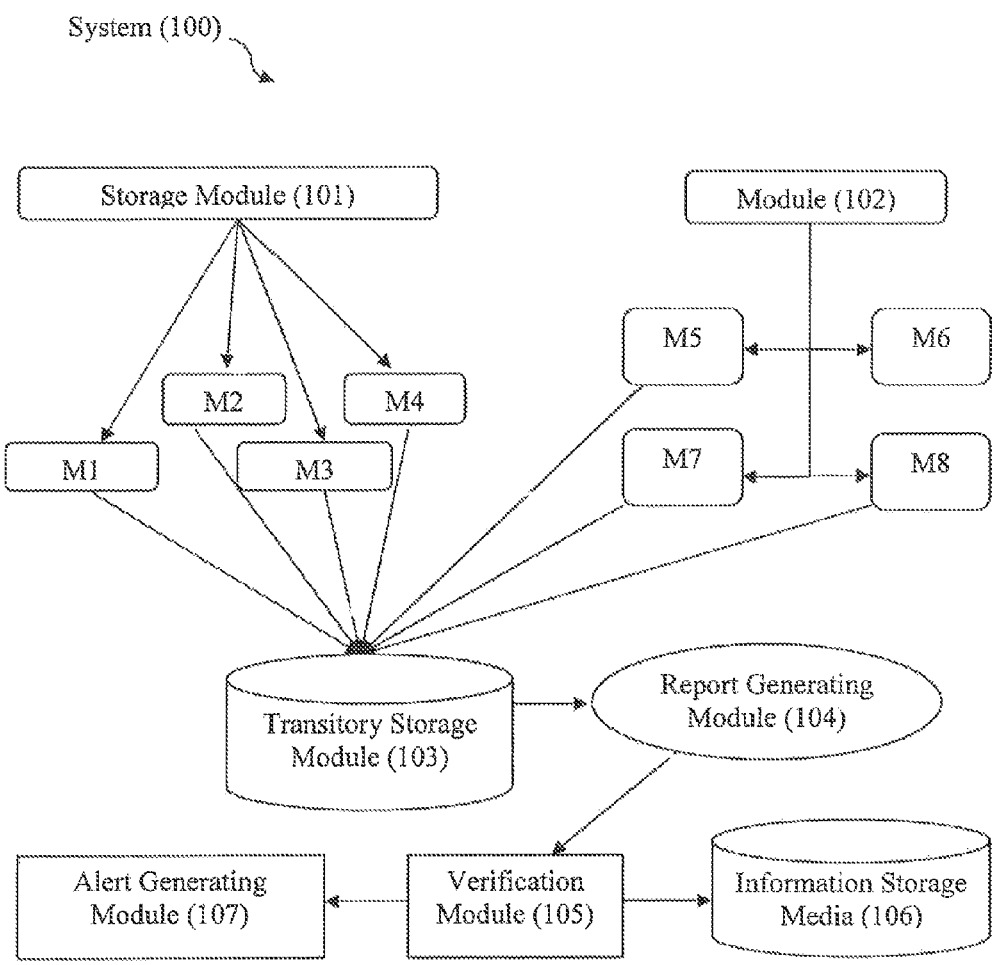

| | | |
|---|---|---|
| 2004/0184591 A1 | 9/2004 | Shimomura et al. |
| 2006/0184800 A1* | 8/2006 | Rosenberg ............... 713/186 |
| 2007/0061314 A1* | 3/2007 | Rosenberg ............... 707/3 |
| 2008/0049983 A1 | 2/2008 | Miller et al. |
| 2009/0118002 A1* | 5/2009 | Lyons et al. ............... 463/29 |
| 2009/0222255 A1* | 9/2009 | Cox et al. ............... 704/1 |
| 2009/0228294 A1 | 9/2009 | Choi et al. |
| 2010/0115114 A1 | 5/2010 | Headley |
| 2010/0185566 A1* | 7/2010 | Schott et al. ............... 706/10 |

OTHER PUBLICATIONS

Babu et alia. Marve: A Prototype Virtual Human Interface Framework for Studying Human-Virtual Human Interactions. T. Panayiotopoulos et al. (Eds.): IVA 2005, 3661, pp. 120-133, 2005.*

Bohus et alia. Dialog in the Open World: Platform and Applications. ICMI-MLMI'09, Nov. 2-4, 2009.*

International Search Report mailed Nov. 20, 2012 in International Application No. PCT/IN2012/000265, 2 pgs.

* cited by examiner

METHOD FOR GENDER VERIFICATION OF INDIVIDUALS BASED ON MULTIMODAL DATA ANALYSIS UTILIZING AN INDIVIDUAL'S EXPRESSION PROMPTED BY A GREETING

PRIORITY CLAIM

This U.S. patent application is a National Stage Entry under 35 U.S.C. §371 of International Application No. PCT/IN2012/000265, titled "SYSTEM AND METHOD FOR DEMOGRAPHIC ANALYTICS BASED ON MULTIMODAL INFORMATION," filed Apr. 12, 2012, which claims the benefit of India Application No. 1220/MUM/2011, titled "SYSTEM AND METHOD FOR DEMOGRAPHIC ANALYTICS BASED ON MULTIMODAL INFORMATION," filed on Apr. 13, 2011, both of which are herein incorporated in their entirety by reference for all purposes.

FIELD OF THE INVENTION

The present invention relates to the field of data processing, and more particularly, to the method and apparatus for gender verification of individuals based on multimodal data analysis approach.

BACKGROUND OF THE INVENTION

In order to capture the record of individuals for according them a unique identification, all the necessary information needs to be gathered and managed in an appropriate database. This information includes their name, gender, age, marital status, any photograph and biometric characteristics like fingerprints, palm prints, retinal identification, iris scan, face recognition or speech samples. Such a valuable piece of information is stored at an appropriate database for further identification of individuals and their gender verification.

However, it has been observed that in many instances the gender or the age of individuals is wrongly entered in such databases when the record comparisons are made in real time. This in turn necessitates the requirement of strategy or methods for gender verification, their ethnicity and age estimation from the gathered demographic information. Automated verification of demographic information has numerous applications including passive surveillance such that each individual is correctly identified and his/her identity is stored in a database to be searched whenever the access is sought.

As a result, an active area of research and development is dedicated to improve biometric characteristic identification in recent years. For example, face detection has been a well researched field to detect the gender based on global features (shape, hair contour) and geometric features (eyebrow thickness, nose width etc.) but the accuracy drawn in such cases has been in the range of 85% to 92%.

Another popular approach to estimate gender and age based on formant/pitch analysis is through the use of speech recognition technology. However, current speech recognition based identification typically exhibits high error rates; their accuracy reported as 98% for clean speech and 95% for noisy speech. Further, speech recognition systems work well under laboratory conditions, but intend to show a considerable decrease in recognition rates when used in a normal operating environment. This decrease in accuracy occurs for the most part because of the unpredictable and variable noise levels found in a normal operating setting, and the way individuals alter their speech patterns to compensate for this noise.

Incorporating name as one of the parameters for gender and/or age identification and verification, also poses multiple challenges based on individual geographical origin or location and hence prone to an error attack of approximately 5%.

There is thus a widely recognized need for, and it would be highly advantageous to have, a method and apparatus for automatically reporting error based on an individual's wrong classification with respect to a particular category, such as an age and/or gender-category.

This in turn triggers the need to develop a more mature and reliable system which reports gender verification and consistency of demographic data maintained at the appropriate database by way of extracting the intelligent information using the multiple data inputs instead of only relying on any of the biometric characteristic recognition techniques.

OBJECT OF THE INVENTION

In accordance with the present invention there is provided a system and method to automatically detect error in a particular category of entry in an information storage media based on predetermined biometric characteristic of individuals and other related information.

Another object of the present invention is to detect error in the gender and age category of the entry in the database.

It is an object of the present invention to utilize name of the individual as the other related information for gender identification.

It is yet another object of the present invention to provide significantly high accuracy rates ranging above 90% for gender detection from facial recognition.

Yet another object of the present invention is to utilize multiple data inputs including the biometric characteristic information to verify the consistency of data made in database in gender or age category.

Another aspect of the present invention utilizes background color, face image features, speech and name as the recognition parameters for gender and age verification.

Still another object of the present invention is to analyze multimodal data for the verification of demographic information.

It is another object of the present invention to achieve maximum performance of the system by extracting intelligent information based on the multiple inputs and deciding on the correctness of those inputs.

Yet another object of the present invention is to generate automatic interactive alerts whenever an incorrect data entry of a particular category is reported.

BRIEF DESCRIPTION OF THE ACCOMPANYING DRAWINGS

The foregoing detailed description of preferred embodiments is better understood when read in conjunction with the appended drawings. For the purpose of illustrating the invention, there is shown in the drawings example constructions of the invention; however, the invention is not limited to the specific methods and system disclosed. In the drawings:

FIG. 1 highlights the well delineated architectural view of the constituting modules performing gender and age verification according to embodiment of the present invention.

Figure 2:
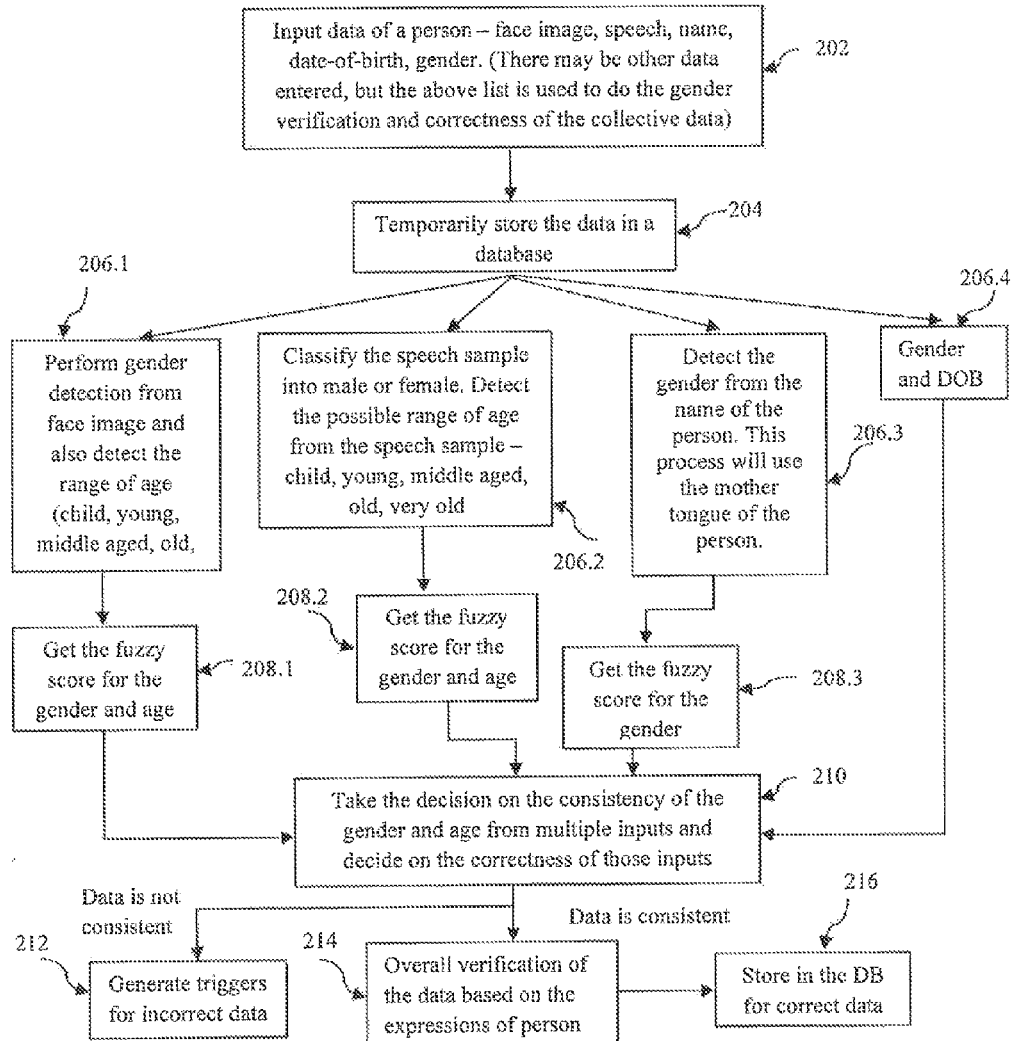

FIG. 2 sets forth the flow diagram illustrating gender verification and checking data consistency according to one aspect of the present invention.

DETAILED DESCRIPTION OF THE INVENTION

Some embodiments of this invention, illustrating all its features, will now be discussed in detail.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention, the preferred, systems and methods are now described. The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

The preferred embodiment of the present invention as described below relate to a method and system which can be used for automatically detecting error in the entry of any categorical information of individuals gathered from a demographic survey. Such an automatic detection of error can be made real time while creating the database or on an existing database on the record of people collected. Specifically, the present invention can be used to detect error in the entry of gender and/or age information of individuals for generating their unique identification number by analyzing speech, image and name of individuals.

Before explaining at least one embodiment of the invention in detail, it is to be understood that the invention is not limited in its application to the details of construction and the arrangement of the components set forth in the following description or illustrated in the drawings.

FIG. 1 shows system architecture for demographic data collection eventually for gender verification. FIG. 2 is a procedural flow diagram illustrating gender verification and checking data consistency according to one of the preferred embodiments of the present invention. The system 100 gathers individual's information like name for anthroponomastic analysis, address, date of birth, gender and biometric characteristics of the individual like voice, facial patterns, respiration volume, skin thickness, biochemical features (e.g., blood biochemistry), fingerprints, palm prints, retinal identification, iris scan (step 202) etc to be stored (step 204) in a temporary storage module 101 constituting the system. The storage module is in communication with a plurality of biometric matching modules through a suitable networking module such as IP network. These biometric engines are capable of processing multimodal biometric data collected.

It will be recognized by those skilled in the art that a biometric matching engine may include any known technologies to detect 2D face, 3D face, hand geometry, single fingerprint, ten finger live scan, iris, palm, full hand, signature, ear, finger vein, retina, DNA, voice etc.

The data gathered temporarily in the storage module 101 is adapted to be processed for the verification of the demographic data. The process of verification can be initiated either at the time of collecting the data and storing it in the storage module or once the entries are made of the record of people in the module. The biometric matching modules in communication with the temporary storage module 101 within a communicating network process the gathered biometric information. Similarly the demographic data is also processed for further verification and subsequently a unique identification is accorded to that record in the maintained information storage media within the storage module 101. The unique identification specifies individual records that could contain face, fingerprint, iris, speech, face recognition enabling recordals. The system therefore, collects multiple data inputs comprising demographic data in module 102 which may include individuals name, sex, height, weight, hair color, eye color, etc. and biometric data in module 103.

The combination of such demographic and biometric data is processed to generate the combined demographic report in the report generating module 104 to verify the consistency of gender and age of a person along with interactivity with the person. This approach tends to reduce errors in the collection and maintenance of demographic records. Once the report gets generated, a multimodal data verification process is initiated in the verification module 105 to generate alerts for abnormalities in gender, age etc. while the valid and accurate data gets stored in the identification information storage media 106. The process of error alert generation is executed by alert generating module 107.

The data obtained from different equipment, commonly referred to as modalities—M1, M2, M3, M4, M5, M6, M7, M8 like biometric matching module or equipment for capturing images or gestures etc is a multimodal fusion which is eventually analyzed for multimodal interpretation.

The gender verification (step 206.1, step 206.2, step 206.3 and step 206.4) can be based on combining some or all of the following multiple parameters:

a. Analyzing background color—Male and female can be asked to stand in front of separate background color. For example red for female and blue for male. Next, by employing image processing technique using any one of the modalities, defined set of attributes, including any values or scores generated, gender verification can be done. b. Face image feature analysis (step 206.1)—Again this can be done with the captured photo from a camera as a modality. Next, to improve the accuracy an approach to associate females with an ethnic identification, commonly understood by that geographically and traditionally common heritage can be made. c. Speech analysis—In this approach, the individual can be asked to tell their name and age (step 206.2) for anthroponomastic analysis. The speech interpretation is done for its content to generate a set of data and/or associated values that can be used to detect the gender. d. Name analysis—This involves anthroponomastic analysis of names to obtain the probability number for a gender (step 206.3).

Instead of only gender verification, a generic data verification approach can be executed which will analyze the consistency of the following:
a. Gender from multiple sources
b. Age information and facial and speech features
c. Name and gender consistency Finally, once the data recording process is over, the system would communicate a note of thanks in a locally identified language as a step indicating the end of verification. The content of thanks is based on gender, so that any discrepancy can be immediately put forward by the user. This will serve the purpose of social courtesy as well as overall verification.

FIG. 2 is a procedural flow diagram illustrating gender verification and checking data consistency according to one of the preferred embodiments of the present invention. As discussed, the system 100 collects multiple data inputs from different modalities 101 & 102 to generate a multimodal data which gets stored at a transitory storage module 103. The different modalities interpret the multimodal data in order to generate a demographic report at report generator module 104. In one of the other embodiments, each of the multimodal interpretation in the set of multimodal interpretations is typically a unimodal interpretation; that is, each is an interpretation of one modality. However, in one of the other embodiments each multimodal interpretation can be generated by more than one modality.

The multi modal interpretations resulting from different modalities are substantially non-overlapping and essentially independent making them non ambiguous interpretations. These interpretations are attributed with one confidence fuzzy score with values associated with it in the verification module 105. These fuzzy scores are analyzed (step 208.1, step 208.2 and step 208.3) and further interpreted to take the decision on the consistency (step 210) of the gender and age from multiple inputs and decide on the correctness of those inputs. The confidence or fuzzy score enables retrieving gender related information. In case of confidence scores lower than the threshold score value, the different modules are reframed to support the gathered gender identification information with more relevant criteria's and parameters determining the gender of an individual. Thus the characterization of gender is invoked using such fuzzy scores and extracting relevant information from different modalities.

In order to verify for the correctness of data entered and to avoid any ambiguity in response generated, a general greeting in a locally identified language is made which will allow a verification of the data in a natural manner based on the expression of the person after this is heard. The error, if reported, gets notified by way of alert generation by module 107 while the correct entries get permanently stored in the information storage media 106.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A method for verifying a gender of an individual and notifying an error based on the verification, the method comprising:
   receiving gender identification from the individual, wherein the gender identification information comprises biometric based gender information, demographic information of the individual, and an expression of the individual;
   assigning, by a processor, a gender to the individual by analyzing a modality of the gender identification information, wherein the modality of the gender identification information is analyzed by employing biometric matching and anthroponomastic analysis;
   assigning a confidence fuzzy score to the analyzed modality, wherein the confidence fuzzy score indicates correctness of the gender assigned to the individual;
   verifying, by the processor, the correctness of the gender assigned to-the individual by checking the expression of the individual by presenting a greeting in a language identifiable by the individual and comparing the confidence fuzzy score with a threshold qualifying score, wherein the expression of the individual is checked using the modality for capturing images or gestures in response to the greeting; and
   notifying, by the processor, an error based on the verification for modifying the assigned gender.

2. The method as claimed in claim 1, wherein the biometric based gender information comprises at least one of: a voice pattern, a facial pattern, a respiration volume, a skin thickness, a biochemical feature, a fingerprint, a palm print, a retinal identification, and an iris scan.

3. The method as claimed in claim 1, wherein the anthroponomastic analysis comprises analysis of a name of the individual.

4. The method as claimed in claim 1, wherein the gender is selected from male, female, and neutral after employing the biometric matching and the anthroponomastic analysis.

5. The method as claimed in claim 1, wherein the method is configured to be implemented in real time.

6. A non-transitory computer-readable medium storing computer-executable instructions for verifying a gender of an individual and notifying an error based on the verification, the non-transitory computer-readable medium comprising the instructions for:
   receiving gender identification information from the individual, wherein the gender identification information comprises biometric based gender information, demographic information of the individual and an expression of the individual;
   assigning a gender to the individual by analysing a modality of the gender identification information, wherein the modality of the gender identification information is analyzed by employing biometric matching and anthroponomastic analysis;
   assigning a confidence fuzzy score to the analyzed modality, wherein the confidence fuzzy score indicates correctness of the gender assigned to the individual;
   verifying the correctness of the gender assigned to the individual by checking the expression of the individual by presenting a greeting in a language identifiable by the individual and comparing the confidence fuzzy score with a threshold qualifying score, wherein the expression of the individual is checked using the modality for capturing images or gestures in response to the greeting; and
   notifying, by the processor, an error based on the verification for modifying the assigned gender.

7. The non-transitory computer-readable medium as claimed in claim 6, wherein the biometric based gender information comprises at least one of: a voice pattern, a facial pattern, a respiration volume, a skin thickness, a biochemical feature, a fingerprint, a palm print, a retinal identification, and an iris scan.

8. The non-transitory computer-readable medium as claimed in claim 6, wherein the anthroponomastic analysis comprises analysis of a name of the individual.

9. The non-transitory computer-readable medium as claimed in claim 6, wherein the gender is selected from male, female and neutral after the biometric matching and the anthroponomastic analysis.

* * * * *